US006674789B1

(12) United States Patent
Fardoun et al.

(10) Patent No.: US 6,674,789 B1
(45) Date of Patent: Jan. 6, 2004

(54) REDUCTION OF EMI THROUGH SWITCHING FREQUENCY DITHERING

(75) Inventors: Abbas Fardoun, Dearborn, MI (US); Luke Comstock, Saginaw, MI (US); Heritianarisoa Rakouth, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 664 days.

(21) Appl. No.: 09/632,024

(22) Filed: Aug. 2, 2000

Related U.S. Application Data

(60) Provisional application No. 60/154,690, filed on Sep. 17, 1999.

(51) Int. Cl.[7] .......................... H04B 15/00; H04K 1/00; H04L 27/30

(52) U.S. Cl. .......................................... 375/132; 330/10

(58) Field of Search ................................ 375/132, 239, 375/346, 284, 285; 330/10, 207

(56) References Cited

U.S. PATENT DOCUMENTS

| | | | | |
|---|---|---|---|---|
| 3,919,609 | A | 11/1975 | Klautschek et al. | 318/227 |
| 4,027,213 | A | 5/1977 | de Valroger | 318/138 |
| 4,217,508 | A | 8/1980 | Uzuka | 310/46 |
| 4,240,020 | A | 12/1980 | Okuyama et al. | 318/721 |
| 4,300,081 | A | 11/1981 | Van Landingham | 318/599 |
| 4,392,094 | A | 7/1983 | Kuhnlein | 318/254 |
| 4,447,771 | A | 5/1984 | Whited | 18/661 |
| 4,458,192 | A | 7/1984 | Sakamoto et al. | 318/798 |
| 4,511,827 | A | 4/1985 | Morinaga et al. | 318/254 |
| 4,556,811 | A | 12/1985 | Hendricks | 310/266 |
| 4,628,499 | A | 12/1986 | Hammett | 364/167 |
| 4,661,756 | A | 4/1987 | Murphy et al. | 318/701 |
| 4,691,269 | A | 9/1987 | Yamane et al. | 363/41 |
| 4,825,132 | A | 4/1989 | Gritter | 318/811 |
| 4,868,477 | A | 9/1989 | Anderson et al. | 318/696 |
| 4,868,970 | A | 9/1989 | Schultz et al. | 29/596 |
| 4,882,524 | A | 11/1989 | Lee | 318/254 |

(List continued on next page.)

OTHER PUBLICATIONS

US 5,491,900, 9/1995, Haga et al. (withdrawn)

Conference Record of the IEEE Catalog No. 87CH2499–2, Oct. 18–23, 1987.

Conference Record of the IEEE Catalog No. 87CH2565–0, Oct. 2–7, 1988.

Brown Boveri Review, vol. 51, No. 8/9, Aug./Sep. 1964.

Power Electronics, vol. 8, Jan. 1993.

Power Electronics, vol. 8, Apr. 1993.

IEEE Transactions on Industry Applications.

IEEE, Low Cost Phase Current Sensing in DSP Based AC Drives, by Francesco Parasiliti et al., Apr. 1999.

IEEE, Single Current Sensor Technique in DC Link of Three–Phase PWM–VS Inverters: A Review and a Novel Solution, by Freded Blaabjerg et al., vol. 33, No. 5., Sep./Oct. 1997.

*Primary Examiner*—Mohammad H. Ghayour
(74) *Attorney, Agent, or Firm*—Michael D. Smith

(57) ABSTRACT

A method of controlling the bandwidth of electromagnetic interference generated by a pulse modulation controlled automotive motor is disclosed. The method comprises providing a controller including at least one register thereof; the controller in signal communication with the motor for controlling the motor based upon operating parameters thereof; selecting a first pulse modulation frequency from a set of pulse modulation frequencies; selecting a first clock frequency; selecting a first hopping frequency; selecting a first switching frequency; initializing the at least one register, establishing thereby a prescribed at least one number; based upon the prescribed at least one number of the at least one register, the first clock frequency and the first hopping frequency randomly changing the switching frequency of the pulse modulation.

7 Claims, 10 Drawing Sheets

U.S. PATENT DOCUMENTS 5,063,011 A 11/1991 Rutz et al. .................. 264/126
5,069,972 A 12/1991 Versic ........................ 428/407
5,122,719 A 6/1992 Bessenyei et al. .......... 318/629
5,155,419 A 10/1992 Naito ......................... 318/254
5,223,775 A 6/1993 Mongeau .................... 318/432
5,257,828 A 11/1993 Miller et al. ............... 180/79.1
5,319,294 A 6/1994 Ohto et al. ............ 318/568.22
5,438,332 A * 8/1995 Adam et al. .................. 342/45
5,444,341 A 8/1995 Kneifel, II et al. ......... 318/432
5,451,900 A 9/1995 Haga et al. ................... 330/10
5,469,215 A 11/1995 Nashiki ...................... 318/432
5,579,188 A 11/1996 Dunfield et al. ......... 360/99.08
5,616,999 A 4/1997 Matsumura et al. ........ 318/632
5,625,542 A 4/1997 Stemmler et al. ............. 363/41
5,646,496 A 7/1997 Woodland et al. .......... 318/632
5,672,944 A 9/1997 Gokhale et al. ............ 318/254
5,760,562 A 6/1998 Woodland et al. .......... 318/632
5,777,449 A 7/1998 Schlager ..................... 318/459
5,780,986 A 7/1998 Shelton et al. .............. 318/432
5,828,333 A * 10/1998 Richardson et al. .......... 342/70
5,852,355 A 12/1998 Turner ........................ 318/701
5,867,380 A 2/1999 Lee ............................. 363/98
5,898,990 A 5/1999 Henry ......................... 29/598
5,920,161 A 7/1999 Obara et al. ................ 318/139
5,963,706 A 10/1999 Baik .......................... 388/804
5,977,740 A 11/1999 McCann ..................... 318/701
5,998,945 A 12/1999 Elliott ........................ 318/254
6,002,226 A 12/1999 Collier-Hallman et al. . 318/439
6,008,599 A 12/1999 Beck .......................... 318/254
6,046,560 A 4/2000 Lu et al. ..................... 318/432
6,049,473 A 4/2000 Jang et al. .................... 363/89
6,051,942 A 4/2000 French ....................... 318/254
6,107,767 A 8/2000 Lu et al. ..................... 318/561
6,124,688 A 9/2000 Coles et al. ................ 318/254
6,381,053 B1 * 4/2002 Fathallah et al. ........... 359/136
6,545,533 B2 * 4/2003 Karki et al. .................. 330/10

* cited by examiner

| $O_3$ | $O_2$ | $O_1$ | $O_0$ | HEX | DEC | COUNTER CYCLES | $f_s$ |
|---|---|---|---|---|---|---|---|
| 0 | 0 | 0 | 0 | C172 | 49522 | 114 | 18394.74 |
| 0 | 0 | 0 | 1 | C171 | 49521 | 113 | 18557.52 |
| 0 | 0 | 1 | 0 | C170 | 49520 | 112 | 18723.21 |
| 0 | 0 | 1 | 1 | C16F | 49519 | 111 | 18891.89 |
| 0 | 1 | 0 | 0 | C16E | 49518 | 110 | 19063.84 |
| 0 | 1 | 0 | 1 | C16D | 49517 | 109 | 19223.53 |
| 0 | 1 | 1 | 0 | C16C | 49516 | 108 | 19415.67 |
| 0 | 1 | 1 | 1 | C16B | 49515 | 107 | 19558.13 |
| 1 | 0 | 0 | 0 | C16A | 49514 | 106 | 19733.02 |
| 1 | 0 | 0 | 1 | C169 | 49513 | 105 | 19971.43 |
| 1 | 0 | 1 | 0 | C168 | 49512 | 104 | 20163.48 |
| 1 | 0 | 1 | 1 | C167 | 49511 | 103 | 20359.22 |
| 1 | 1 | 0 | 0 | C166 | 49510 | 102 | 20553.32 |
| 1 | 1 | 0 | 1 | C165 | 49509 | 101 | 20782.28 |
| 1 | 1 | 1 | 0 | C164 | 49508 | 100 | 20970. |
| 1 | 1 | 1 | 1 | C163 | 49507 | 99 | 21181.62 |

FIG. 8

EPS MOTOR CURRENT, Dithering
(broadband noise)

FREQUENCY

REDUCTION OF EMI THROUGH SWITCHING FREQUENCY DITHERING

CROSS-REFERENCE TO RELATED APPLICATIONS

This application claims the benefit of U.S. provisional application No. 60/154,690, filed Sep. 17, 1999 the disclosures of which are incorporated herein by reference in their entirety as if set forth at length.

BACKGROUND OF THE INVENTION

All commercial electrical systems must meet specific Electro-Magnetic Interference (EMI) limits. EMI solutions are usually quite expensive. In some systems 30% of the whole cost is related to EMI/EMC (compatibility) for large filters, shielding, etc. In the Electric Power Steering (EPS) system the main contributor to RF noise is the Pulse Width Modulation (PWM) operation used for current control. PWM generates narrow-band noise in the form of a spike at every integer harmonic of the PWM switching frequency. The vehicle's radio is a serious victim to narrow-band noise, since the above harmonics can appear as distinct tones at the output of the radio. This invention converts the narrow-band noise into broadband noise and reduces the peak amplitude thereof by varying the switching frequency of the PWM within a small range.

The PWM harmonic spikes have an amplitude given by:

$$(At/T_s)\cdot|(\sin(\pi f_n t)/(\pi f_n t)| \quad (1)$$

where A is the amplitude of the pulses, t is the PWM "on" time, $T_s$ is the PWM switching period and $f_n$, is an integer multiple of $1/T_s$, the switching frequency, $f_s$. The spectrum is a series of spikes spaced apart by $f_s$, bounded by the modulus of a sine-shaped envelope as seen in FIG. 1.

BRIEF SUMMARY OF THE INVENTION

A method of controlling the bandwidth of electromagnetic interference generated by a pulse modulation controlled automotive motor is disclosed. The method comprises providing a controller including at least one register thereof; the controller in signal communication with the motor for controlling the motor based upon operating parameters thereof; selecting a first clock frequency; selecting a first switching frequency; initializing the at least one register, establishing thereby a prescribed at least one number; selecting a first hopping period; based upon the prescribed at least one number of the at least one register, the first clock frequency and the first hopping frequency randomly modulating the switching frequency of the pulse modulation.

BRIEF DESCRIPTION OF THE DRAWINGS

FIG. 8 is a table of the output the pseudo-random number generator of FIG. 7 in one-to-one relation with an ordered list of pulse width modulation frequencies.

DETAILED DESCRIPTION OF THE INVENTION

Figure 1:
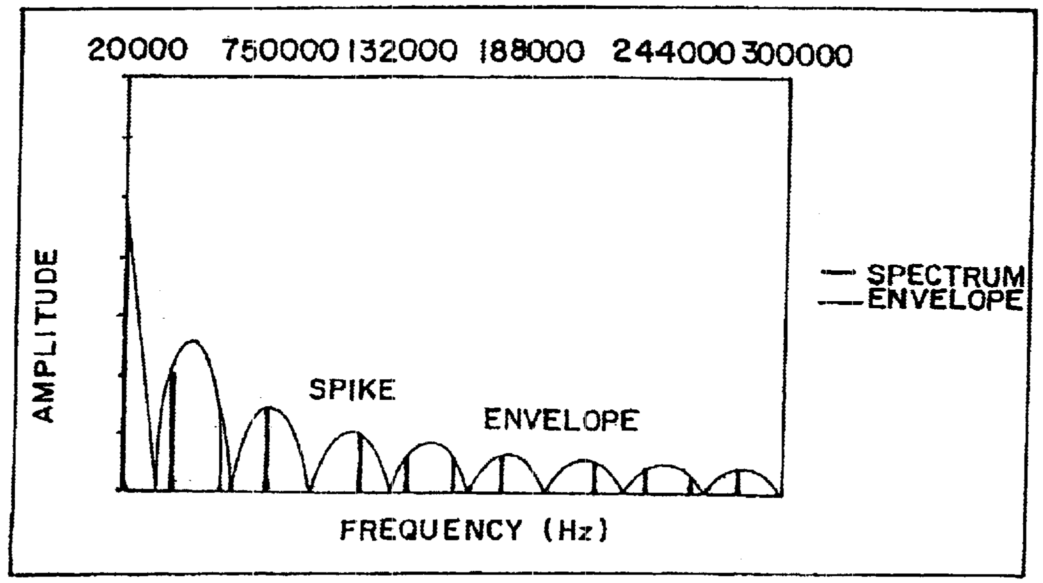
FIG. 1 is a representation of the spectrum of pulse width modulation showing spikes at harmonic frequencies and a modulus of a sine-shaped envelope.
Figure 2:
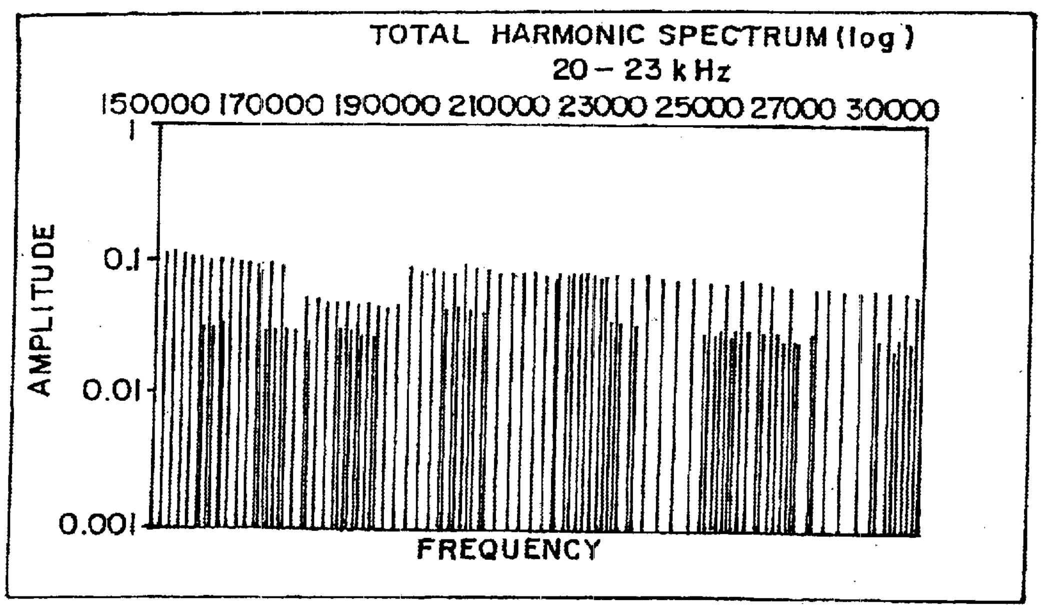
FIG. 2 is a representation of the spectrum of pulse width modulation subject to frequency dithering.

The concept of PWM frequency "dithering" involves using a particular PWM switching frequency, $f_s$, only for a set number of PWM switching periods, $T_s$, before changing to another switching frequency, $f_s$, and making this "hop" periodically. Each switching frequency, $f_s$, used contributes unique harmonic content, but since it is not used constantly, the equivalent amplitude is much lower. The end result is a spectrum that is continuous and lower in peak amplitude.

The dithering process reduces the overall cost of the system. It does not require any additional components and is implemented through software. Allowing larger amplitude of RF noise while simultaneously decreasing the peak level of emissions reduces the cost needed for filtering and shielding.

There are numerous parameters involved in PWM frequency dithering, including switching frequency range, number of switching frequencies used, "hopping" frequency and the manner of frequency selection. The ideal case would encompass an infinite number of switching frequencies available (continuous distribution), changing thereamongst very quickly and selection therefrom at random. In this case the RF noise becomes pure broadband with amplitude lower than in the case of narrow band peaks.

Unfortunately, the ideal conditions are not realizable, so a compromise must be reached between system demands and broadband ideality. The EPS system is not capable of making truly random selections and it can only operate at a certain number of discrete switching frequencies. Changing the switching frequency very quickly can also cause throughput and stability problems. Generating a table of pseudo-random numbers within a range may approximate random selection of switching frequencies by ensuring that the sequence can not repeat fast enough to cause submodulation.

Simulation and theoretical calculations were used to predict results. However, the authoritative result is the audio output of the radio. Accurate models of coupling media and radio behavior can be derived, but the subjective nature of the human ear is not easily modeled. Therefore the real merit of any frequency dithering format is the final product, i.e., how it sounds. The following results were discovered:

1) The hopping frequency, $f_h$, is the most important factor. The "sound" of the noise is highly dependent on the hopping frequencies. Fairly white sounding noise was achieved with a hopping period of less than 500 μs.

2) Using as few as two switching frequencies can eliminate tones at the output of the radio (see #3 for the Δf between them).

3) The range of frequencies from which to select should be determined by the IF bandwidth of the radio, the RF frequency range of the radio and the approximate PWM fundamental. The switching range should be big enough such that when multiplied by the harmonic number that corresponds to the radio's RF input, it exceeds the IF bandwidth. For example, for PWM near 20 kHz with an IF bandwidth of 9 kHz and a RF of 150 kHz (for European LW), the range of switching frequencies used should be greater than 9 kHz×20 kHz/150 kHz=1.2 kHz. Note that this is the minimum value that can be used and the maximum value is dependent on the stability of the system.

4) Increasing the number of discrete switching frequencies used improves results, with diminishing returns for very large numbers.

Figure 3:
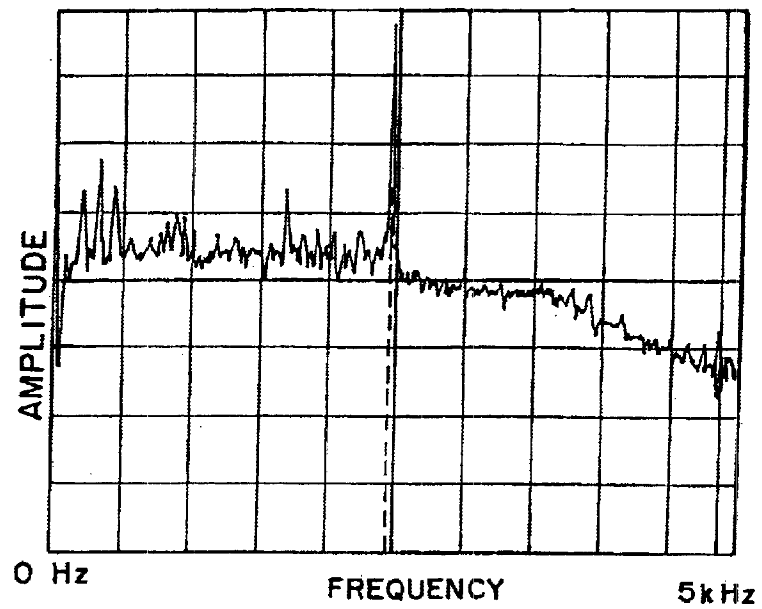
FIG. 3 shows the resulting tone caused by fixed frequency pulse width modulation.
Figure 4:
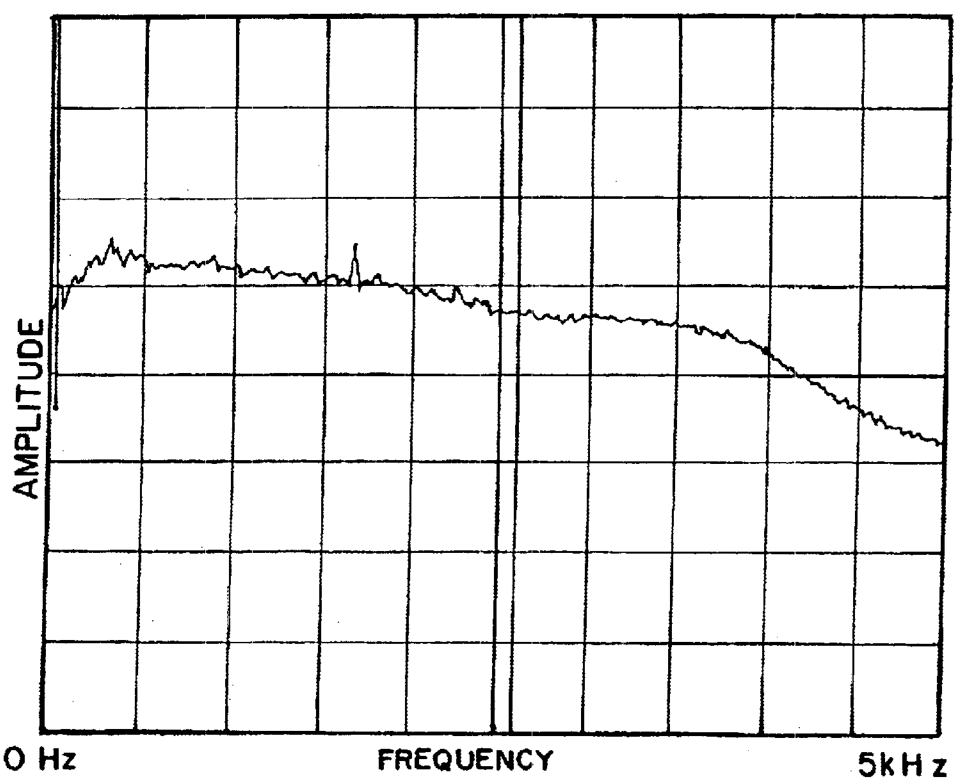
FIG. 4 shows the reduced volume "white noise" from 16 pulse width modulation frequencies selected pseudo-randomly every 250 $\mu$s.

FIG. 3 shows the resulting tone caused by fixed frequency PWM and FIG. 4 shows the reduced volume "white noise" from 16 switching frequencies, $f_s$, selected pseudo-randomly every 250 μs. The dithering process reduces the overall cost of the system. It does not require any additional components and is implemented through software. Allowing larger amplitude of RF noise while simultaneously decreasing the peak level of emissions reduces the cost needed for filtering and shielding.

Figure 5:
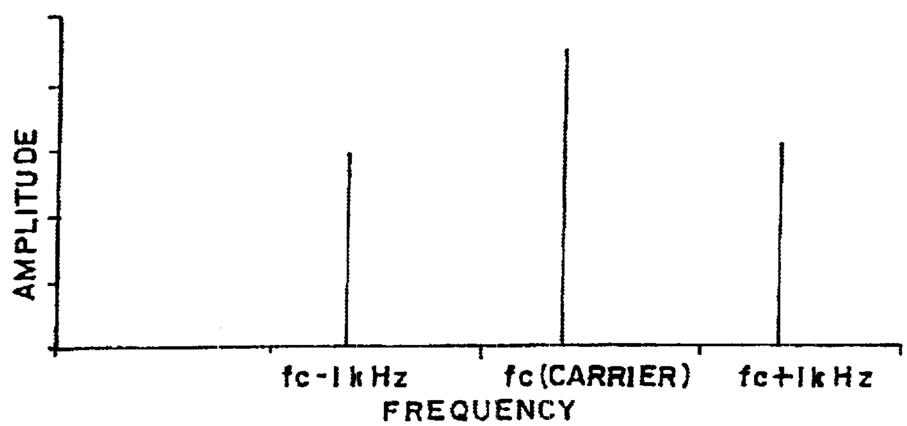
FIG. 5 is a representation of the spectrum of a pure tone broadcast.

Fixed frequency (standard) PWM generates harmonics at every integer multiple of the switching frequency as seen in Equation 1 and FIG. 1. Radio receivers and other electronic equipment are susceptible to this narrowband noise that is focused on specific frequencies. If an AM radio station broadcasts a pure tone, the resulting spectrum is shown in FIG. 5. Since the IF bandwidth of the radio is centered at the carrier frequency, $f_c$, and the smaller spikes (sidebands) both fit within the 9 kHz bandwidth, the radio decodes the 1 kHz tone. When a radiated harmonic from the pulse width modulation is close in frequency to a radio station, the radio demodulates it as an audible tone in exactly the same fashion.

Switching frequency dithering is an alternative method to Pulse Width Modulation (PWM). The goal is to spread the emitted RF energy over a larger frequency range (broader band) so that the resulting EMI is similar to white noise. Radio receivers are especially less susceptible to this type of EMI because the noise bandwidth is much larger than the IF bandwidth. For PWM, a switching period, $T_s$, contains "on" time and "off" time. The sum of these two times is the switching period, $T_s$. Current is controlled by varying the ratio of the on and off times, i.e., the duty ratio, D. Thus:

$T_s=t_{on}+t_{off}$ and $$D=t_{on}/T_s. \tag{3}$$

In standard PWM implementation, the switching period, $T_s$, is constant and only the duty ratio, D, varies. Switching frequency dithering is the process of changing $T_s$. This is done independent of the current control scheme. For example, constant current would mean varying $T_s$ without varying D; the on time and the off time would change together.

TABLE 1

| Parameter | Unit | Description | Examples |
|---|---|---|---|
| Hopping Frequency, $f_h$ | (Hz) | How often does the switching period, $T_s$, change? | 1 kHz, 2 kHz, 4 kHz . . . |
| $\Delta f_h$ | (Hz) | How big is the change or hop? | 1 Hz, 100 Hz 10 kHz . . . |
| N | (#) | How many different switching frequencies, $f_s$, are used? | 2, 25, 100, 1000. |
| Selection | | In what order will the switching frequencies, $f_s$, be used? | Sequential, pseudo-random, etc. |
| $f_{max}$—$f_{max}$ | (Hz) | What is the range of switching frequencies, $f_s$, to be used? | 1 Hz, 1 kHz, 100 kHz . . . |

The ideal implementation of switching frequency dithering would involve switching frequencies, $f_s$, chosen at random from a large continuous distribution, hopping thereamongst as fast as possible. The resultant spectrum would become a pure broadband with the peak level lower than the narrowband peak level.

The hopping frequency, $f_h$, should be as high as possible. The only limiting factor is the switching frequency, $f_s$. The fastest possible implementation is to only use a switching frequency, $f_s$, for one switching period, $T_s$, before "hopping" a different one. For the hopping frequency, $f_h$, to be known exactly, the switching frequencies, $f_s$, must be chosen specifically as integer multiples of the hopping frequency $f_h$. EPS is constrained to 18 kHz<$f_s$<30 kHz by audio and thermal issues, so a high hopping frequency limits the number of switching frequencies that can be used. Using a flexible hopping frequency solves this problem. The hop to a new switching frequency, $f_s$, can only take place at the end of a switching period, $T_s$, so the new switching frequency, $f_s$, then begins. As an example, assume the hopping period ($T_h=1/f_h$) equals 500 μs, $f_{s1}$=19.5 kHz and $f_{s2}$=21 kHz. 19.5 kHz runs for 9 periods, totaling 462 μs. The 500 μs mark is reached during the tenth period, so that period finishes for a total of 513 μs. Pulse width modulation then happens at 21 kHz for 524 μs (11 periods). Note that the hopping frequency varies around 2 kHz. As an aside, this flexible hopping frequency also helps to eliminate modulating an audible tone in components of the system.

The ideal implementation is a continuous distribution of switching frequencies (N=∞). An electric power steering system (EPS) is capable of frequencies fitting Equation 2 where $f_s$ is the switching frequency and n is an integer.

$$f_s=2.097\text{ MHz}/n \quad 84\leqq n\leqq 116$$

$$18.02\text{ kHz}\leqq f_s\leqq 25.00\text{ kHz} \tag{2}$$

Below 18 kHz is the forbidden audio range and above 25 kHz is detrimental to thermal performance. This suggests that there are 32 potential switching frequencies, but limiting that to only about 10 through 20 improves system stability by limiting the total frequency range.

The lowest frequency band of interest for emissions determines the range of switching frequencies, $f_s$, that is required. The term broadband implies that the RF spectrum is continuous and without gaps. To accomplish this, the $n^{th}$ harmonics of the PWM fundamental frequencies must overlap with the $(n+1)^{th}$ harmonics in the frequency band of interest. The spectrum is fairly flat broadband above the frequency $f_{int}$ in the above equation. For example: with a minimum switching frequency of 18 kHz and a maximum switching frequency of 21 kHz, the spectrum becomes flat (without gaps) above about 126 kHz. Thus, $$f_{int} > f_{max} \cdot f_{min} / (f_{max} - f_{min}) \quad (3)$$

The last parameter in the dithering process is the order in which the switching frequencies are used. Ideally this selection would be random, but the EPS controller cannot accomplish this. Fortunately, pseudo-random selection is adequate. Stepping through the switching frequencies in a given order causes sub-modulation in the audio range if the length of the series isn't sufficient. A pattern should take at least 0.5 ms before it repeats ($f_h$<2000 Hz). For this reason, a look-up table or pseudo-random generation is adequate.

Figure 6:
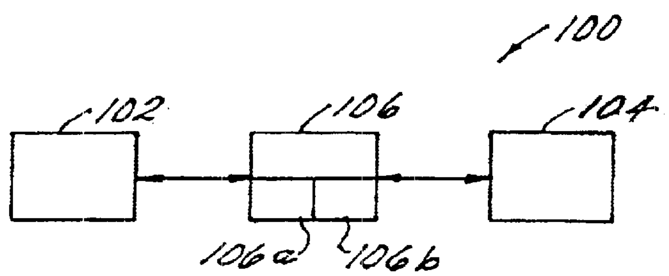
FIG. 6 is a schematic representation of an automotive motor in signal communication with a controller.
Figure 12:
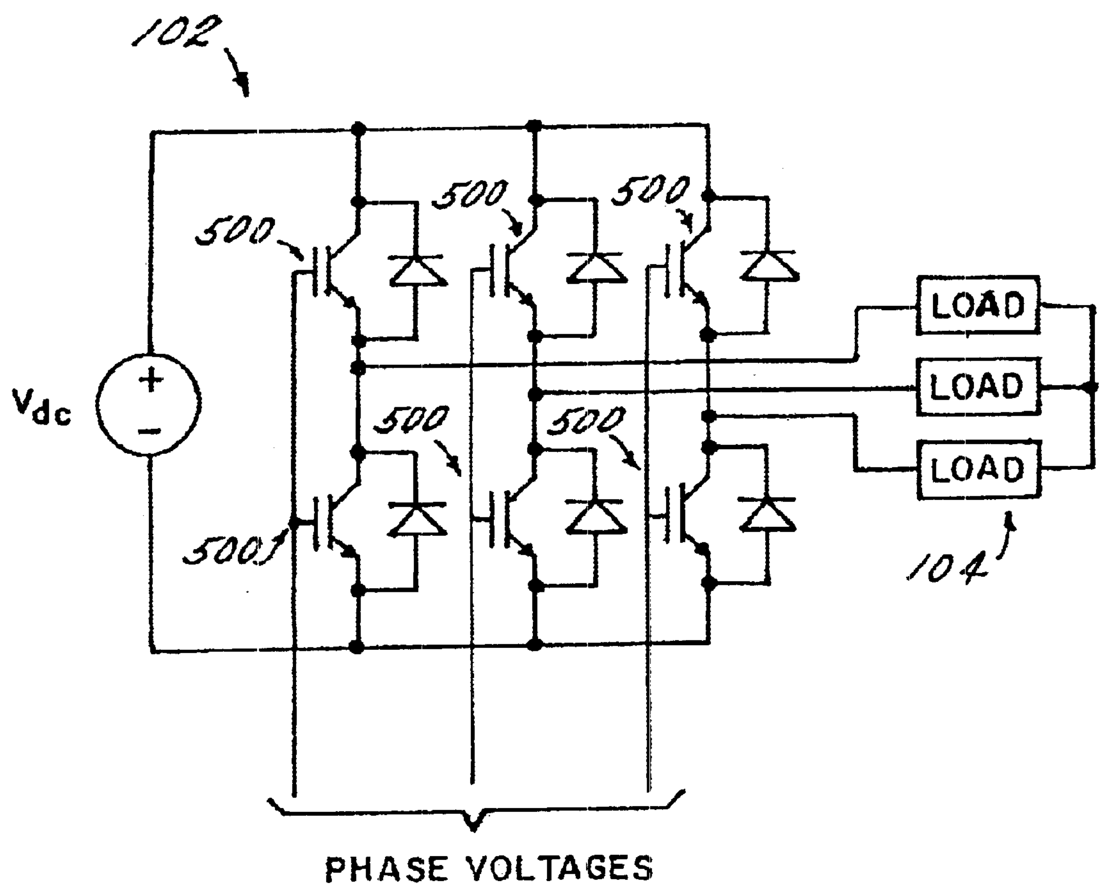
FIG. 12 is a generalized schematic representation of a system for effecting the pulse width modulation of a sinusoidally excited three phase load.

In FIG. 6 the relevant parts of a system 100 for effecting the pulse width modulation frequency dithering are the EPS controller 102 and the EPS motor 104. Inside the controller 102 are power MOSFETs (shown at 500 in FIG. 12 by way of exemplification) used to switch the current to the motor 104. A Brushless Motor Drive (BMD) integrated circuit (IC) 106 controls these switches in either a voltage mode reset or a current mode reset manner. Inside the BMD IC 106 are two registers 106*a*, 106*b*. The first register 106*a* is for setting the Duty Ratio, D, and the second register 106*b* is for switching period, $T_s$. These registers 106*a*, 106*b* contain numbers, $N_1$ and $N_2$ respectively which the IC must "count to" with a 2.097 MHz clock. At the beginning of a switching period, $T_s$, the proper MOSFETs 500 are activated based upon motor 104 position and desired direction of rotation. After the amount of time, $\Delta t_1 = N_1/f_{clk}$, specified by the value in the Duty Ratio register 106*b* has passed, these MOSFETs 500 are deactivated. The clock continues to run until the amount of time, $\Delta t_2 = N_2/f_{clk}$, specified by the switching period register 106*a* expires. At this point, the switching period, $T_s$, is reset and the MOSFETs 500 are reactivated. By changing these two registers 106*a*, 106*b* in proportion, the switching frequency, $f_s$, can be changed without changing the current level to the motor 104.

However, the Duty Ratio register 106*b* is not always the trigger that turns the MOSFETs 500 off. Sometimes the current level to the motor 104 triggers a reset. In this mode, a change of switching frequency, $f_s$, causes a small change in average (DC) current level. These changes induce audio modulation that can be heard from the motor 104. If the controller 102 changes between only a couple of switching frequencies, $f_s$, this would cause a tone of one-half the hopping frequency, $f_h$, to be heard in the motor 104. With several switching frequencies being used and a pseudo-random selection thereof, the noise from the motor 104 is somewhat white and is far less offensive.

The microprocessor of the controller 102 has serial communications with the BMD IC 106 periodically along a bus 102*a*. A new switching frequency command is sent to the BMD IC 106 at the end of the hopping period, $T_h$, for example, 500 $\mu$s; thus updating the switching frequency register 106*a*. When needed, the Duty Ratio register 106*b* is also updated. The next switching period, $T_s$, is at a new switching frequency, $f_s$.

Figure 7:
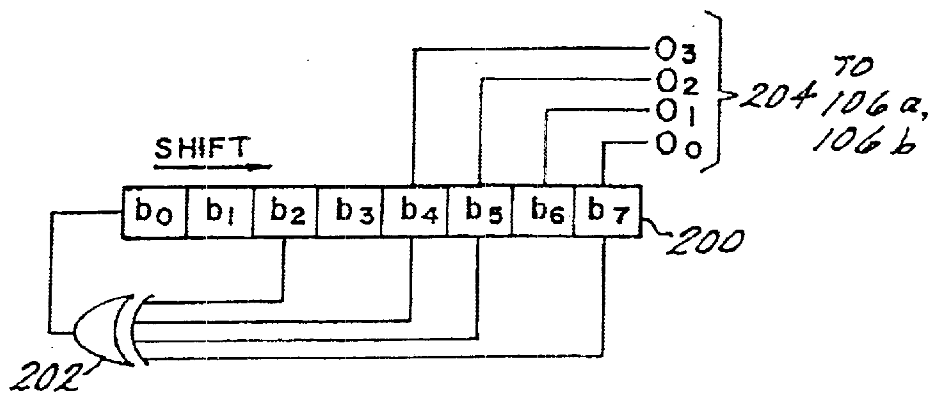
FIG. 7 is a logic diagram of a pseudo-random number generator.

Two frequency dithering methods are provided. Both use the same switching frequencies, $f_s$, and switch between them at the same hopping frequency, $f_h$. The difference between the methods is the demand that each places on the system memory and throughput. In the first dithering method a memory contains a list of switching frequencies that are loaded sequentially into the BMD IC 106. Each value in the list is a random choice from among several possibilities. After it is created, the list is stored permanently as part of the software. In the second dithering method, a shift register 200 is combined with a modulo-two summing function 202 to form a linear feedback register as seen in FIG. 7. Four of the register bits are XORed to form the input to an 8-bit register, creating a pseudo-random sequence that is 255 symbols long. Half of the contents of the shift register 200 form a 4-bit output 204 in one-to-one relation with 16 possible switching frequencies, $f_s$, as seen in the table in FIG. 8. The 16 switching frequency register commands are part of the software. In FIG. 8 the four leftmost columns represent the 4-bit output from the shift register 200. The column labeled "HEX" contains the hexadecimal values of switching frequencies supplied to the switching frequency register 106*a*. The column labeled "DEC" contains the decimal representation of the aforesaid hexadecimal values. The column labeled "Counter Cycles" contains the decimal representation of the last two digits of the hexadecimal values. The column labeled $f_s$ represents the switching frequency such that $$2.0970 \div \text{Counter Cycles} = f_s \text{ Mhz.} \quad (4)$$

Figure 9:
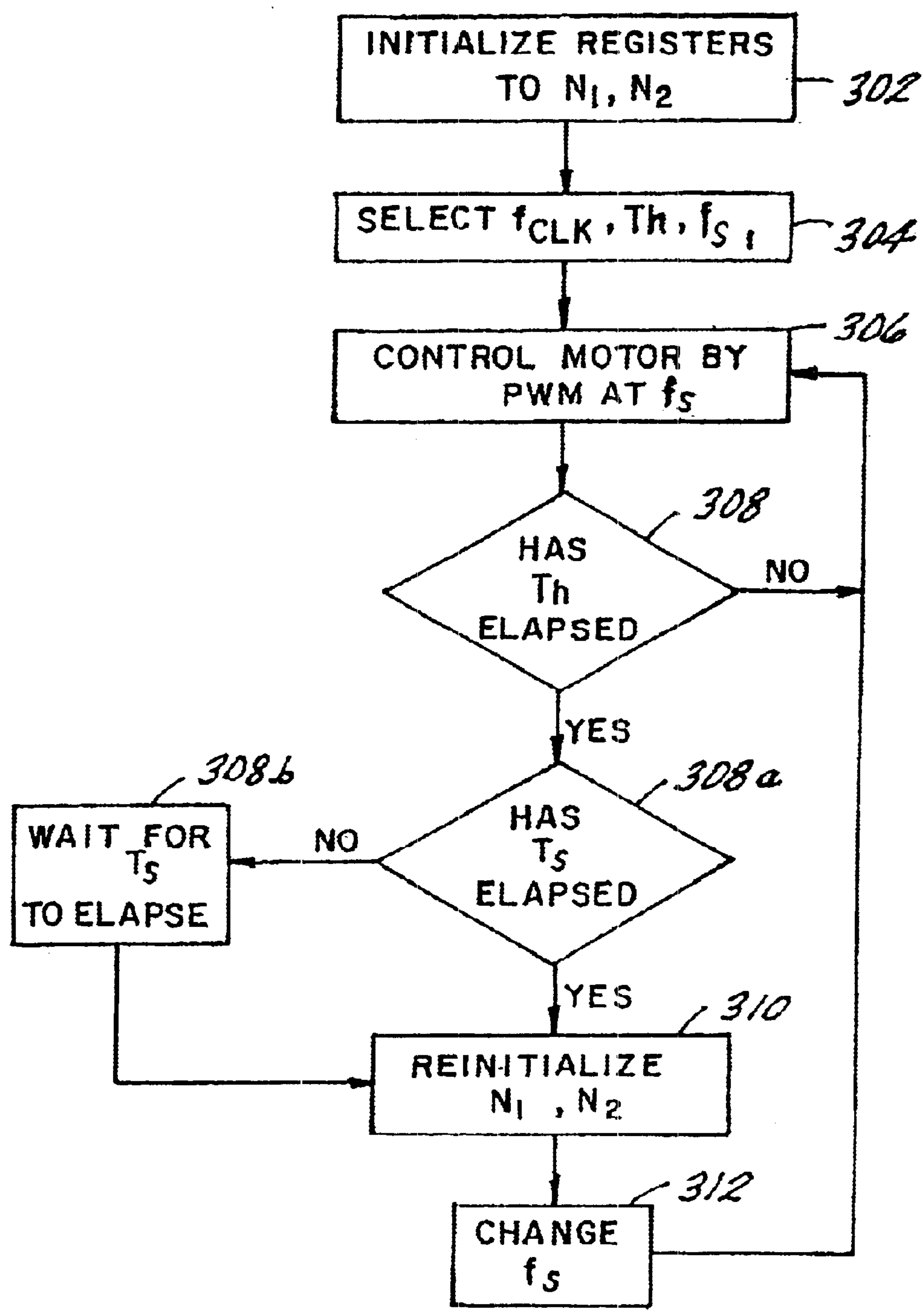
FIG. 9 is a first generalized flow diagram of the method of the present invention.

A generalized flow diagram 300 of the method of the present invention may be seen in FIG. 9. In box 302 the first register 106*a* is initialized to a first prescribed number, $N_1$, from a finite set of prescribed numbers and the second register 106*b* is initialized to a second prescribed number, $N_2$, from a finite set of prescribed numbers. In block 304 a first clock frequency, $f_{clk}$, is selected, a first hopping period, $T_h$, is selected and a first switching frequency, $f_{s1}$, is selected from a finite set of switching frequencies. In block 306, based upon the prescribed first and second numbers, $N_1$ and $N_2$, the first clock frequency, $f_{clk}$, the first switching frequency, $f_{s1}$, and the first hopping period, $T_h$, the motor 104 is controlled by pulse width modulation at the first switching frequency, $f_{s1}$. In block 308, if the hopping period, $T_h$, has not elapsed, the motor 104 continues to be controlled by the pulse width modulation at the first switching frequency, $f_{s,\ If\ Th}$ has elapsed, then at block 308*a*, if the switching period, $T_s$, has elapsed then in block 310, the first and second registers 106*a*, 106*b* are at least pseudo-randomly reinitialized to a third prescribed number, $N_3$, and a fourth prescribed number, $N_4$, in response to a command from the microprocessor 102 thereby at least pseudo-randomly changing the first switching frequency, $f_{s1}$, to a second switching frequency, $f_{s2}$, and thus controlling the motor 104 by pulse width modulation at the second switching frequency, $f_{s2}$. In block 308*b*, the switching period, $T_s$, is allowed to elapse before reinitializing the first and second registers 106*a*, 106*b*. The pulse width modulation control of the motor 104 at the new switching frequency, $f_{s2}$, continues until the hopping period, $T_h$, and switching period, $T_s$, have again elapsed and upon command from the microprocessor, the third prescribed number, $N_3$, and the fourth prescribed number, $N_4$, are thereby at least pseudo-randomly changed to $N_5$ and $N_6$, thus, at least pseudo-randomly changing the second switching frequency, $f_{s2}$, to a third switching frequency, $f_{s3}$, thus controlling the motor 104 by pulse width modulation at the third switching frequency, $f_{s3}$. The aforedescribed pulse width modulation of the motor 104 at successive pseudo-random switching frequencies, $f_{si}$, continues in a cyclic fashion as the first and second registers 106*a*, 106*b* are reinitialized at the end of the hopping period, $T_h$, with the prescribed numbers, $N_i$.

Figure 10:
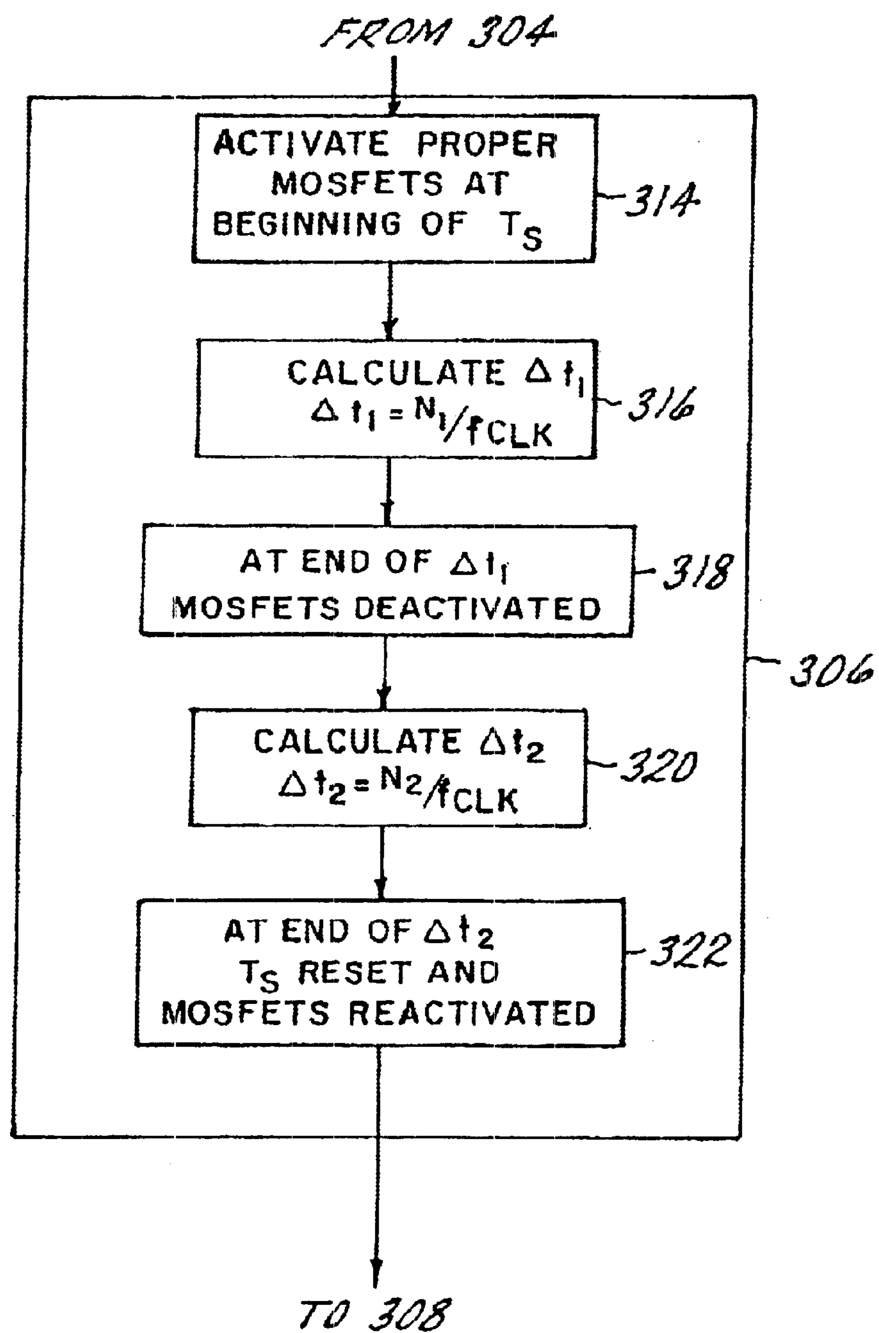
FIG. 10 is a second generalized flow diagram of the method of the present invention.

A generalized flow diagram of box 306 of FIG. 9 is shown in FIG. 10. At box 314 the proper MOSFETs 500 are activated at the beginning of the switching period, $T_s$. At box 316 the amount of time, $\Delta t_1=N_1/f_{clk}$, specified by the value in the Duty Ratio register 106*b* is calculated. In box 318, at the end of $\Delta t_1$ the aforesaid MOSFETs 500 are deactivated. At box 320, the amount of time, $\Delta t_2=N_2/f_{clk}$, specified by the switching period register 106*a* is calculated. At box 322, at the end of $\Delta t_2$, the switching period is reset and the MOSFETs 500 are reactivated.

Figure 11:
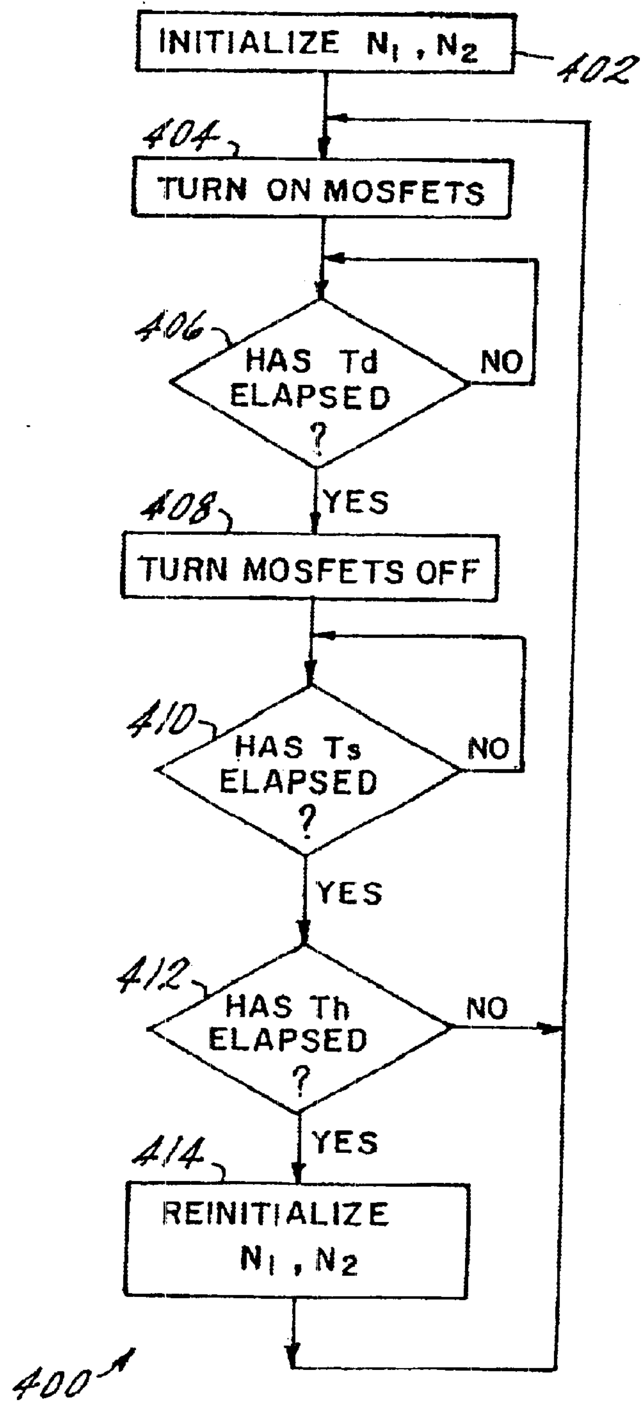
FIG. 11 is a third generalized flow diagram of the method of the present invention.

The generalized flow diagram in FIG. 11 depicts a further embodiment of the method of the present invention. In box 402 the registers 106*a*, 106*b* are initialized to the first and second prescribed numbers, $N_1$ and $N_2$. In box 404 the MOSFETs 500 are turned on. In box 406, if $t_{on}$ of Equation 3 has elapsed then the MOSFETs 500 are turned off at box 408. In box 410 and box 412, if $T_s$ and $T_h$ have elapsed, then the registers 106*a*, 106*b* are reinitialized at box 414.

Figure 13:
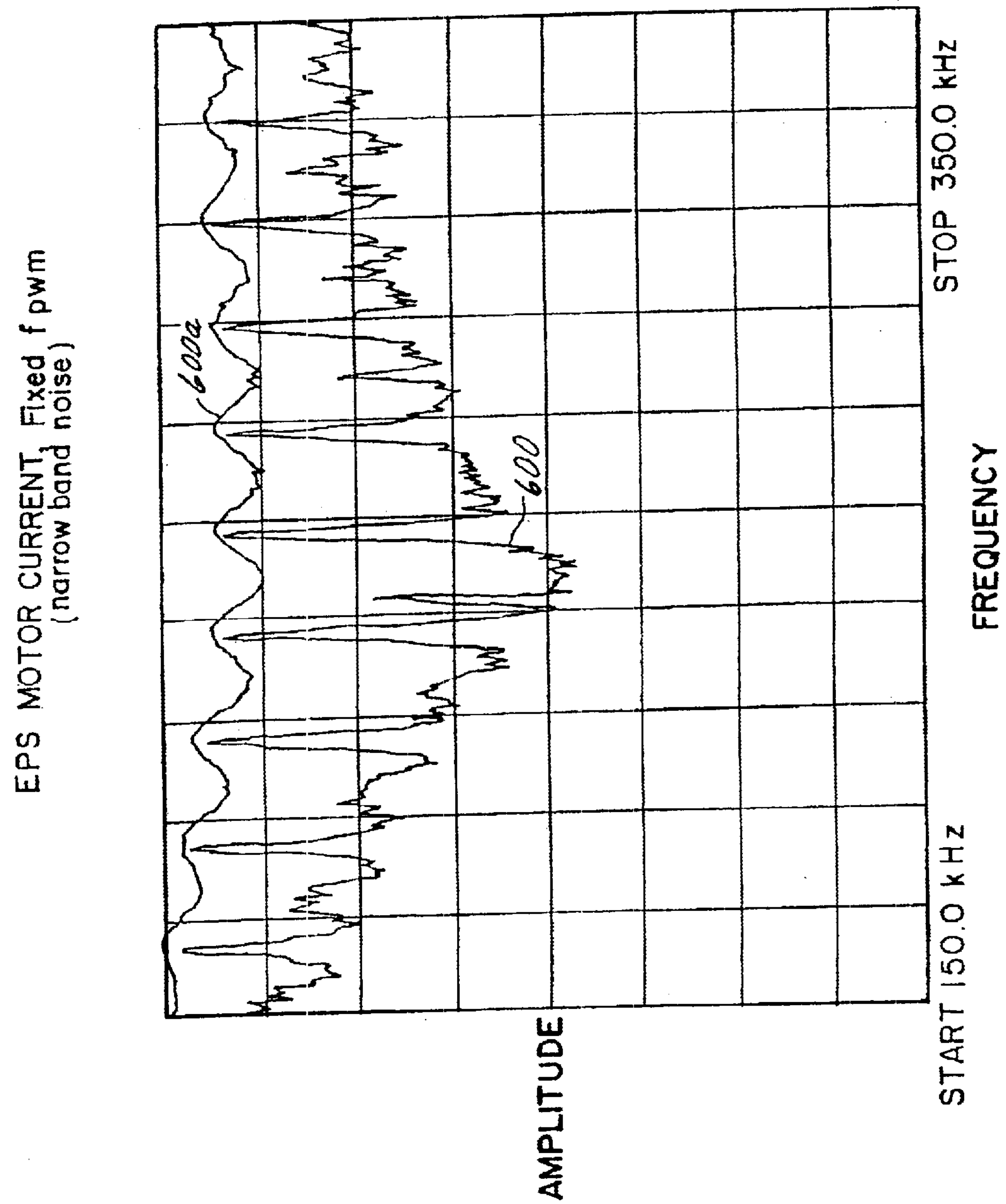
FIG. 13 is a representation of the narrow band noise of the motor current subject to fixed frequency pulse width modulation.
Figure 14:
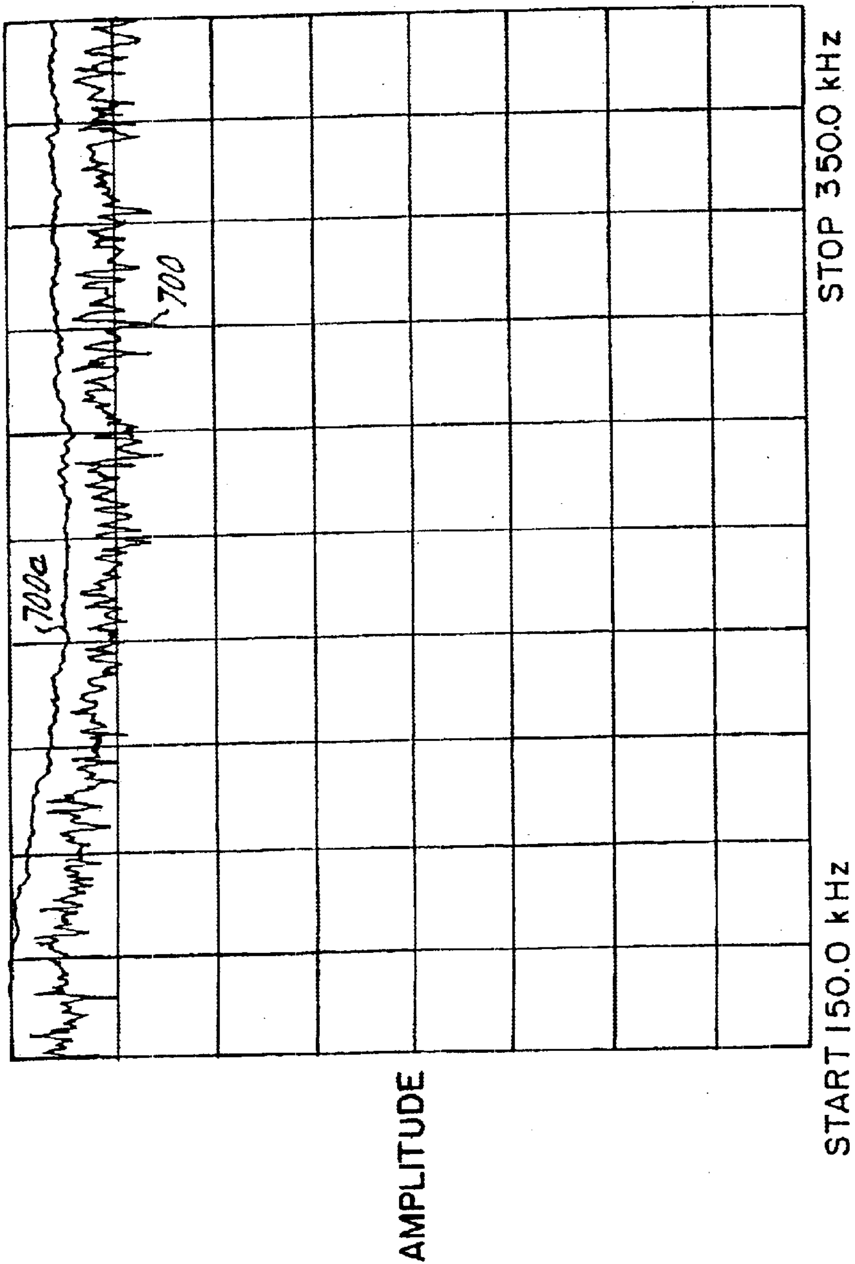
FIG. 14 is a representation of the broadband noise of the motor current subject to pulse width modulation frequency dithering.

The effectiveness of the present invention may be seen with reference to FIGS. 13 and 14. In FIG. 13 the traces designated by the reference numeral 600 and 600*a* show relatively prominent spikes in signal amplitude at regular intervals of a fixed switching frequency, $f_s$, for two input frequency bandwidths. This is indicative of narrowband noise; whereas in FIG. 14 the traces designated by the reference numeral 700 and 700*a* show a relatively smoother signal amplitude as a result of the dithering of the switching frequency, $f_s$ at the same input frequencies. This is indicative of broadband noise.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. A method of controlling the bandwidth of electromagnetic interference generated by a pulse modulation controlled steering motor, the method comprising:

providing a controller including at least one register thereof;

the controller in signal communication with the motor for controlling the motor based upon operating parameters thereof;

selecting a first clock frequency;

selecting a first hopping frequency;

selecting a first switching frequency;

initializing the at least one register; establishing thereby a first prescribed at least one number; and based upon the first prescribed at least one number of the at least one register, the first clock frequency and the first hopping frequency randomly changing the switching frequency of the pulse modulation.

2. The method as set forth in claim 1 wherein randomly changing the switching frequency of the pulse modulation includes selecting successive switching frequencies from a randomly generated list.

3. The method as set forth in claim 1 wherein randomly changing the switching frequency of the pulse modulation includes randomly selecting successive switching frequencies from a list.

4. The method as set forth in claim 3 wherein randomly selecting the successive switching frequencies from a list includes selecting the successive switching frequencies from a list based upon a number generated by a pseudo-random number generator.

5. The method as set forth in claim 4 wherein the pseudo-random number generator comprises a shift register in feedback with a logic gate generating as output therefrom an ordered list of numbers in one to one relation with an ordered list of switching frequencies.

6. The method as set forth in claim 1 wherein randomly changing the switching frequency of the pulse modulation includes activating switches in the controller for controlling the motor at the beginning of the switching period;

calculating a first time interval;

at the end of the first time interval, deactivating the switches in the controller;

calculating a second time interval; and at the end of the first time interval, resetting the switching period and reactivating the switches in the controller.

7. The method as set forth in claim 1 further comprising:

allowing the hopping frequency to elapse;

allowing the switching frequency to elapse; and thereupon reinitializing the at least one register.

* * * * *